United States Patent [19]

Senatore et al.

[11] Patent Number: 4,882,416

[45] Date of Patent: Nov. 21, 1989

[54] PREPARATION OF POLY ARYLENE SULFIDE WITH SPECIFIED RATIO OF SULFUR SOURCE TO CYCLIC ORGANIC AMIDE

[75] Inventors: Guy Senatore, Borger, Tex.; Wei-Teh W. Shang; Kenneth D. Goetz, both of Bartlesville, Okla.

[73] Assignee: Phillips Petroleum Company, Bartlesville, Okla.

[21] Appl. No.: 209,253

[22] Filed: Jun. 20, 1988

Related U.S. Application Data

[63] Continuation of Ser. No. 17,948, Feb. 24, 1987, abandoned.

[51] Int. Cl.$^4$ .............................................. C08G 75/16
[52] U.S. Cl. .................................................... 528/388
[58] Field of Search ........................................ 528/388

[56] References Cited

U.S. PATENT DOCUMENTS 4,663,430  5/1987  Ostlinning et al. ................. 528/388
4,786,711  11/1988  Senatore et al. ..................... 528/388

*Primary Examiner*—Harold D. Anderson
*Attorney, Agent, or Firm*—J. D. Brown

[57] ABSTRACT

Arylene sulfide polymers which can be linear, branched or modified are prepared by a process which comprises the steps of: (a) admixing a sulfur source and a cyclic organic amide in the presence of water to form an aqueous admixture wherein the molar ratio of the sulfur source to the cyclic organic amide is at least about 0.6:1 to about 1:1; (b) dehydrating said aqueous admixture to form a dehydrated admixture; (c) admixing with said dehydrated admixture at least one polymerizable halosubstituted aromatic compound to form a polymerization mixture; (d) subjecting the polymerization mixture to polymerization conditions effective to produce the arylene sulfide polymer; and (3) recovering the arylene sulfide polymer.

17 Claims, No Drawings

PREPARATION OF POLY ARYLENE SULFIDE WITH SPECIFIED RATIO OF SULFUR SOURCE TO CYCLIC ORGANIC AMIDE

This application is a continuation of application Ser. No. 017,948, filed Feb. 24, 1987, now abandoned.

FIELD OF THE INVENTION

This invention relates to processes for the production of polymers from aromatic compounds. In one aspect, this invention relates to processes for the production of arylene sulfide polymers. In another aspect, this invention relates to processes for the production of linear or branched arylene sulfide polymers. In still another aspect, this invention relates to processes for the production of modified arylene sulfide polymers.

BACKGROUND OF THE INVENTION

A basic process for the production of arylene sulfide polymers from polyhalo-substituted compounds by reaction with an alkali metal sulfide in a polar organic solvent is disclosed in U.S. Pat. No. 3,354,129. Since then a great deal of work has been done to provide methods of modifying or controlling the melt flow rate of arylene sulfide polymers thus produced. For example, the use of polyhalo-substituted aromatic compounds having more than two halogen substituents per molecule has been utilized to provide branched arylene sulfide polymers of low melt flow rate. One such process is disclosed in U.S. Pat. No. 4,116,947. In addition, the use of alkali metal carboxylates has provided a method for the production of modified arylene sulfide polymers of higher molecular weight and a correspondingly lower melt flow rate than that obtained in a similar polymerization process but in the absence of the alkali metal carboxylates. Such a process is disclosed in U.S. Pat. No. 3,919,177.

The wide variety of end use applications which can employ arylene sulfide polymers has been an important factor underlying the need for processes to provide the above-described branched or modified arylene sulfide polymers of reduced melt flow rate as well as processes for producing linear arylene sulfide polymers having a very high melt flow rate.

Another important property of arylene sulfide polymers relates to thermal stability of the polymers. This thermal stability or lack thereof can become very important in processes in which the arylene sulfide polymer is maintained at elevated temperatures for an appreciable length of time. For many applications it is important that the arylene sulfide polymer have a relatively high degree of thermal stability. A very convenient way to ascertain the degree of thermal stability of an arylene sulfide polymer has been to observe the change in the polymer melt flow rate after heating the polymer for specified periods of time and at specified temperatures. The polymer melt flow rate determined after the specified heating period has been designated the "cure rate". The "cure rate" value determined by the method described herein is inversely related to the rate at which the polymer cures. Therefore, polymer having a high "cure rate" value cures slower than polymer having a low "cure rate" value. Thermal stability of a polymer is relative and is determined by comparing one polymer to another. Specifically, the greater the "cure rate" value for polymers of similar initial molecular weight the more thermally stable the polymer is when compared to the other polymers.

A variety of methods have been employed in the art in an attempt to provide improved thermal stability to arylene sulfide polymers. For example, additives of various types have been employed in an attempt to improve the stability of arylene sulfide polymers. However these methods have not always been completely successful and suffer from various disadvantages such as the cost of the added stabilizing additives. Some additives also may deleteriously affect the physical properties of the final arylene sulfide polymer composition which obviously would also be a disadvantage. Thus, other means are desired in order to improve the thermal stability of arylene sulfide polymers particularly those which are characterized as the linear arylene sulfide polymers.

Improvements are always desired in polymerization processes such as those employed in producing arylene sulfide polymers wherein expensive reactants are involved. In such cases it is highly desirable that improvements in polymer yield for the reactor charge be obtained whenever possible so that the cost of producing the arylene sulfide polymers can be correspondingly reduced.

Typical processes for producing arylene sulfide polymers have generally involved the separation of particulate solid polymer containing a certain level of impurities from a liquid phase by means of a filtration step whether in the initial separation prior to any purification steps or during a purification sequence employing a liquid such as water to wash out water soluble impurities from the polymer. Such filtration steps can become time consuming and thus expensive in the process for the production of arylene sulfide polymers. Thus improvements in the filtration rate in the separation of particulate arylene sulfide polymer from a liquid is also highly desirable.

It is therefore an object of this invention to provide a method for producing arylene sulfide polymers which may be linear, branched or modified in a high reactor yield. It is another object of this invention to provide a method for producing arylene sulfide polymers in which the particulate polymer is separated from liquid at a high filtration rate. It is another object of this invention to provide a method for producing arylene sulfide polymers which have a high degree of thermal stability.

BRIEF STATEMENT OF THE INVENTION

In accordance with this invention a method is provided for preparing arylene sulfide polymers of the linear, branched or modified type which comprises the steps of: (a) admixing compounds comprising at least one sulfur source and at least one cyclic organic amide in the presence of water to form an aqueous admixture wherein the molar ratio of said sulfur source to said cyclic organic amide is at least about 0.6:1 to about 1:1; (b) dehydrating said aqueous admixture to form a dehydrated admixture; (c) admixing with said dehydrated admixture at least one polymerizable halo-substituted aromatic compound to form a polymerization mixture; (d) subjecting the polymerization mixture to polymerization conditions effective to produce the arylene sulfide polymer and (e) recovering the arylene sulfide polymer.

DETAILED DESCRIPTION

In one embodiment of the present invention, a process for preparing linear arylene sulfide polymers is provided which comprises the steps of: (a) admixing compounds comprising at least one sulfur source and at least one cyclic organic amide in the presence of water to form an aqueous admixture wherein the molar ratio of said sulfur source to said cyclic organic amide is at least about 0.6:1 to about 1:1; (b) dehydrating said aqueous admixture to form a dehydrated admixture; (c) admixing with said dehydrated admixture at least one dihalo-substituted aromatic compound to form a polymerization mixture; (d) subjecting said polymerization mixture to polymerization conditions effective to produce a mixture comprising an arylene sulfide polymer; and (e) recovering said linear arylene sulfide polymer. The arylene sulfide polymer thus produced in high yield has a relatively high melt flow rate and a high degree of thermal stability. Such polymers are particularly useful in applications such as encapsulation of electronic components and in the formation of coating compositions.

In another embodiment of this invention, a polyhalo-substituted aromatic compound having 3-6 halogen atoms per molecule is employed along with the dihalo-substituted aromatic compound in step (c) of the process described above. In this embodiment a branched arylene sulfide polymer is produced in high yield.

In another embodiment of this invention, an alkali metal carboxylate is added to the aqueous admixture of step (a) of the process described above. According to this embodiment a modified arylene sulfide polymer is produced in high yield which has a reduced melt flow rate.

In still another embodiment of this invention, an alkali metal carboxylate is added to the aqueous admixture of step (a) of the process described above and a polyhalo-substituted aromatic compound having 3-6 halogen atoms per molecule is added with the dihalo-substituted aromatic compound in step (c) of the process described above. According to this embodiment of the invention a branched modified arylene sulfide polymer is produced in high yield and having a reduced melt flow rate.

As can be seen from the various embodiments of the invention described above, a variety of arylene sulfied polymers can be produced according to the invention with improvements in polymer yield, polymer thermal stability, and polymer filtration rate. It was unexpected that by the very simple means of adjusting the molar ratio of a suitable sulfur source to the cyclic organic amide as shown above that the various improvements would result therefrom.

A group of compounds which can serve as suitable sulfur sources include alkali metal sulfides, alkali metal bisulfides and hydrogen sulfide.

Alkali metal sulfides which can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. The preferred alkali metal sulfide for use according to this invention is sodium sulfide. The alkali metal bisulfides which can be employed in the process of this invention include sodium bisulfide, potassium bisulfide, rubidium bisulfide, cesium bisulfide, and mixtures thereof. The preferred alkali metal bisulfide for use according to this invention is sodium bisulfide.

When an alkali metal sulfide is employed as the sulfur source there is no need to employ therewith an alkali metal hydroxide. However, for the other suitable sulfur sources it is preferred that an alkali metal hydroxide be employed in conjunction with these various suitable sulfur sources. For the alkali metal bisulfides employed according to this invention the molar ratio of alkali metal hydroxide to alkali metal bisulfide is about 0.3:1 to about 4:1 preferably about 0.4:1 to about 2:1. When employing hydrogen sulfide according to this invention the molar ratio of alkali metal hydroxide to hydrogen sulfide should be about 1.3:1 to about 5:1, preferably about 1.4:1 to about 3:1.

Alkali metal hydroxides which can be employed according to this invention include lithium hydroxide, sodium hydroxide, potassium hydroxide, rubidium hydroxide, and cesium hydroxide. Sodium hydroxide is the preferred alkali metal hydroxide for use according to this invention.

The cyclic organic amides used in the various embodiments of this invention should be substantially liquid at the reaction temperatures and pressure employed. Cyclic organic amides can have 5 to about 12 carbon atoms per molecule. Examples of some suitable cyclic organic amides include N,N'-ethylenedipyrrolidone, N-methyl-2-pyrrolidone, pyrrolidone, caprolactam, N-methylcaprolactam, N-ethylcaprolactam and mixtures thereof. N-methyl-2-pyrrolidone is the preferred cyclic organic amide for use according to this invention.

The polymerizable halo-substituted aromatic compounds employed according to this invention are selected from the group consisting of dihalo-substituted aromatic compounds having 6 to about 22 carbon atoms per molecule and mixtures of dihalo-substituted aromatic compounds with polyhalo-substituted aromatic compounds having 3-6 halogen atoms per molecule. Preferably, the dihalo-substituted aromatic compounds are selected from the group consisting of p-dichloro-substituted aromatic compounds and mixtures of p-dichloro-substituted aromatic compounds with a total of 0 to about 10 mole percent of at least one of m-dichlorobenzene, o-dichlorobenzene and alkyl-substituted p-dichlorobenzenes having the formula

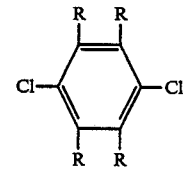

wherein R is H or an alkyl group having 1-4 carbon atoms and at least one R is not H. Examples of suitable dihalo-substituted aromatic compounds include p-dichlorobenzene, p-dibromobenzene, p-diiodobenzene, 1-chloro-4-bromobenzene, 1-chloro-4-iodobenzene, 1-bromo-4-iodobenzene, 1-butyl-4-ethyl-2,5-dibromobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-ethyl-3-butyl-2,5-dichlorobenzene, 1-ethyl-2,5-diodobenzene, 1-butyl-2,5-dichlorobenzene, 1,2,4,5-tetrabutyl-3,6-dichlorobenzene, m-dichlorobenzene, and o-dichlorobenzene.

Polyhalo-substituted aromatic compounds having 3–6 halogen atoms per molecule which can be employed in the process of this invention can be represented by the formula $R^1X_n$ where each X is selected from the group consisting of chlorine, bromine, and iodine, n is an integer of 3 to 6, and $R^1$ is a polyvalent aromatic radical of valence n which can have up to about 4 methyl substituents with the total number of carbon atoms in $R^1$ being within the range of 6 to about 16.

Examples of suitable polyhalo-substituted aromatic compounds having 3–6 halogen atoms per molecule which are suitable for use in this invention include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene and mixtures thereof.

Alkali metal carboxylates which can be employed in the process of this invention can be represented by the formula $R^2CO_2M$ where $R^2$ is a hydrocarbyl radical selected from alkyl, cycloalkyl, and aryl and combinations thereof such as alkylaryl, alkylcycloalkyl, cycloalkylalkyl, arylalkyl, and arylcycloalkyl, said hydrocarbyl radical having 1 to about 20 carbon atoms, and M is an alkali metal selected from the group consisting of lithium, sodium, potassium, rubidium, and cesium. Preferably, $R^2$ is an alkyl radical having 1 to about 6 carbon atoms or a phenyl radical and M is sodium. If desired, the alkali metal carboxylate can be employed as a hydrate or as a solution or dispersion in water. Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, potassium benzoate, sodium benzoate, sodium 4-phenylcyclohexane carboxylate, cesium hexanoate, and mixtures thereof. Sodium acetate is a preferred alkali metal carboxylate.

Although the mole ratio of dihalo-substituted aromatic compound to said suitable sulfur source can vary somewhat, generally it will be within the range of about 0.8:1 to about 2:1, preferably within the range of about 0.95:1 to about 1.3:1. The mole ratio of polyhalo-substituted aromatic compound having 3–6 halogen atoms per molecule to said sulfur source can also vary considerably, depending in part on the halogen content of said polyhalo-substituted aromatic compound and on the presence or absence of other reaction mixture components such as the alkali metal carboxylate. Generally the mole ratio will be within the range of about 0.0002:1 to about 0.014:1 and preferably within the range of about 0.001:1 to about 0.012:1. The molar ratio of alkali metal carboxylate when employed to said sulfur source can also vary over a wide range, but generally will be within the range of about 0.05:1 to about 1.5:1, preferably within the range of about 0.1:1 to about 0.8:1. As discussed above, the molar ratio of said suitable sulfur source to the cyclic organic amide according to this invention will be within the range of at least about 0.6:1 to about 1:1.

The temperature at which the polymerization can be conducted can vary over a wide range and will generally be within the range of from about 235° C. to about 450° C., and preferably from about 240° C. to about 350° C. The reaction time will be within the range of from about 10 minutes to about 72 hours and preferably about 1 hour to about 8 hours. The pressure need be only sufficient to maintain the polymerizable halo-substituted aromatic compound and the cyclic organic amide substantially in the liquid phase, and to substantially retain the sulfur source therein.

The arylene sulfide polymers produced by the various embodiments of this invention can be separated from the reaction mixture by conventional procedures, for example, by filtration of the polymer followed by washing with water, or by dilution of the reaction mixture with water, followed by filtration and water washing the polymer.

The arylene sulfide polymers prepared by the various embodiments of this invention can be blended with fillers, pigments, fibers, extenders, other polymers and the like. They can be cured through a crosslinking and/or chain extension reaction such as by heating at temperatures up to about 480° C. in the presence of a free oxygen-containing gas. These arylene sulfide polymers find utility in the production of coatings, films, molded objects, fibers, encapsulation compositions and the like.

EXAMPLES

Examples are provided in an effort to assist one skilled in the art to a further understanding of the invention, and yet not be unduly limitative of the reasonable scope of the invention. The particular reactants, conditions, ratios and the like, are all intended to be illustrative of our invention, and not limitative of the reasonable and suitable scope thereof.

EXAMPLE I

A series of polymerization runs were performed in a 90 gallon stirred (400rpm) reactor for the preparation of poly(phenylene sulfide) (PPS). The polymerization recipe for these runs is presented below:

| | Compound, lb-mole |
|---|---|
| N—methyl-2-pyrrolidone (NMP) | 2.49 |
| Sodium hydroxide (NaOH)[a] | 1.020–1.063 |
| Sodium bisulfide (NaSH)[b] | 1.048–1.053 |
| p-Dichlorobenzene (p-DCB) | 1.061–1.075 |

[a]Charged as an aqueous solution of 50.353 wt. % NaOH.
[b]Charged as an aqueous solution of 58.977 wt. % NaSH and 0.317 wt. % $Na_2S$.

In each run the aqueous NaOH and aqueous NaSH were premixed in a separate vessel then the warmed (approx. 115° C.) liquid mixture charged with a following NMP flush to the reactor containing enough of the remaining NMP to attain the desired NaSH/NMP mole ratio prior to the dehydration step. The mixture was then subjected to a dehydration step wherein water plus a small amount of NMP was removed from the reactor by distillation at a reflux ratio of 1:1. Withdrawal of overhead started at a reactor temperature of 167°–169° C. and ended at 233°–257° C. over a period of 84–115 minutes. The amount distilled overhead was 75.5–79.3 lbs. The remaining NMP was then charged to the reactor for the polymerization step.

Molten p-DCB was then charged to the reactor at 213°–227° C. and the reactor temperature increased at 0.56°–0.78° C./minute to 271°–274° C. in approximately 100 minutes. The reaction mixture was then held at 274° C. for 25 minutes. The reactor was vented for recovery of volatiles for 54–59 minutes to 69–70 psig, heated to 282° C. then the reactor contents transferred to another vessel wherein reduced pressure conditions caused the remaining NMP and other volatiles to be flashed overhead for recovery.

The recovered reaction mixture comprising PPS was washed once with ambient tap water, rinsed with hot(82° C.) water, washed once with deaerated water at 176° C. with a hot water rinse and given a final wash with deaerated water at 176° C. with a hot deionized water rinse. The washing steps utilized a PPS slurry mixing tank and a nylon fabric filter cloth on a moving horizontal belt filter system to separate the PPS from the wash/rinse liquid. The washed PPS obtained from each run was dried and a sample tested for extrusion rate and cure rate according to the methods described. The results obtained are presented in TABLE I below.

As used herein, the term extrusion rate refers to a flow rate measurement on molten polymer based on ASTM D1238, Procedure B—Δ Automatically Timed Flow Rate Measurement, made at 600° F., using a total driving mass of 345 grams and an orifice having the dimensions of 0.0825 ±0.0002 inch diameter and 1.250±0.002 inch length.

As used herein, the term melt flow rate refers to a flow rate measurement on molten polymer based on ASTM D1238, Procedure B—Δ Automatically Timed Flow Rate Measurement, made at 600° F., using a total driving mass of 5 kilograms and an orifice having the dimension of 0.0825±0.0002 inch diameter and 0.315±0.001 inch length.

EXAMPLE II

In accordance with the polymerization procedure described in Example I, samples of several batches were taken at the end of polymerization but prior to recovery of the PPS by the flash method described in Example I. The samples were washed, filtered and dried, and polymerization reactor yield determined. The results obtained are presented in TABLE II below

TABLE II

| Run No. | Reactor Charges, lb-moles | | | | Molar Ratio, Dehydration | NaSH/NMP Polymerization | Reactor Yield, % |
|---|---|---|---|---|---|---|---|
| | NaOH | NaSH | NMP | P-DCB | | | |
| 5(a,d) | 1.021 | 1.053 | 2.49 | 1.062 | 0.42 | 0.42 | 94.89 |
| 6(a) | 1.020 | 1.050 | 2.49 | 1.061 | 0.42 | 0.42 | 94.08 |
| 7(a) | 1.021 | 1.049 | 2.49 | 1.061 | 0.42 | 0.42 | 94.08 |
| 8(b,c,e) | 1.063 | 1.050 | 2.49 | 1.075 | 0.65 | 0.42 | 95.91 |
| 9(b,c,e) | 1.063 | 1.050 | 2.49 | 1.075 | 0.65 | 0.42 | 96.62 |

(a)Control run.
(b)Invention run.
(c)The NaSH was charged as an aqueous solution of 58.991 wt. % NaSH and 0.34 wt. % Na₂S.
(d)The NaOH was charged as an aqueous solution of 50.193 wt. % NaOH and the NaSH was charged as an aqueous solution of 59.325 wt. % NaSH and 0.560 wt. % Na₂S.
(e)The reactor temperature was increased 0.28–1.1° C./minute from 211–274° C. in 82–107 minutes with a total polymerization time of approximately 125 minutes.

The results in TABLE II indicate that increasing the NaSH/NMP mole ratio prior to the dehydration step between 0.42 and 0.65 results in PPS having a significantly improved reactor yield.

EXAMPLE III

In accordance with the polymerization procedure described in Example I, samples of several batches were taken after recovery of the PPS by the flash method but prior to washing of the recovered PPS. A slurry was prepared from each sample by mixing 71.6 g of the recovered PPS mixture (approximately one-half PPS and one-half NaCl) with 210.7 g of water at a temperature of 21° C. The slurry was mixed and the vacuum source adjusted. The slurry was poured onto the laboratory filter, the filter was opened to the vacuum source and the timer started simultaneously. The timer was stopped as soon as the cake was formed. The results obtained are presented in TABLE III below.

TABLE III

| Run No. | Reactor Charges, lb-mole | | | | Molar Ratio, Dehydration | NaSH/NMP Polymerization | Filtration Time, Sec. | |
|---|---|---|---|---|---|---|---|---|
| | NaOH | NaSH | NMP | p-DCB | | | 10"Hg Vacuum | 20"Hg Vacuum |
| 10(a) | 1.030 | 1.049 | 2.49 | 1.061 | 0.42 | 0.42 | 7.8 | 5.8 |
| 2(a) | 1.030 | 1.049 | 2.49 | 1.061 | 0.55 | 0.42 | 7.62 | 6.2 |
| 11(b) | 1.030 | 1.049 | 2.49 | 1.062 | 0.65 | 0.42 | 7.2 | 4.5 |
| 12(b) | 1.030 | 1.049 | 2.49 | 1.062 | 0.70 | 0.42 | 6.7 | 4.86 |

(a)Control run.
(b)Invention run.

TABLE I

| Run No. | Reactor Charges, lb-moles | | | | Molar Ratio, NaSH/NMP | | Extrusion Rate, g/10 min | Cure Rate g/10 min. |
|---|---|---|---|---|---|---|---|---|
| | NaOH | NaSH | NMP | p-DCB | Dehydration | Polymerization | | |
| 1(a) | 1.031 | 1.050 | 2.49 | 1.061 | 0.42 | 0.42 | 55 | 82 |
| 2(a) | 1.030 | 1.049 | 2.49 | 1.061 | 0.55 | 0.42 | 60 | 121 |
| 3(b) | 1.030 | 1.049 | 2.49 | 1.062 | 0.65 | 0.42 | 52 | 189 |
| 4(b) | 1.021 | 1.048 | 2.49 | 1.061 | 0.77 | 0.42 | 77 | 545 |

(a)Control run.
(b)Invention run.
(c)Cure rate is the melt flow rate measured after the polymer has been heated for 6 hours at 264° C. in an air oven.

The results in TABLE I indicate that increasing the NaSH/NMP mole ratio prior to the dehydration step above 0.55 results in PPS having a markedly increased cure rate.

The results in TABLE III indicate that increasing the NaSH/NMP mole ratio prior to the dehydration step between 0.55 and 0.65 results in PPS having improved filterability.

EXAMPLE IV

A series of polymerization runs were performed in a 2000 gallon stirred reactor for the preparation of PPS. In each run the aqueous NaOH and aqueous NaSH were premixed in a separate vessel then the warmed liquid mixture charged with a following NMP flush to a dehydration vessel containing enough NMP to obtain the desired NaSH/NMP mole ratio in the dehydration step. This mixture was subjected to a dehydration step wherein water plus a small amount of NMP was removed from the dehydration vessel by distillation. Withdrawal of overhead was made for a period of 44–57 minutes with the final temperature being 217°–224° C. The dehydrated mixture was then transferred to the polymerization reactor followed by an NMP flush containing the remaining NMP.

Molten p-DCB was then charged to the reactor and the reactor temperature increased from 210° C. to 232° C. at 1.1° C./minute. The temperature of the reaction mixture was then increased to 254° C. at 0.56° C./minute and subsequently increased to 274° C. at 0.72° C./minute. The reaction mixture was then held at 274° C. about 25 minutes. The reactor was vented for recovery of volatiles, heated to 282° C. then the reactor contents transferred to another vessel wherein reduced pressure conditions caused the remaining NMP and other volatiles to be flashed overhead for recovery.

The recovered reaction mixture was washed and filtered. The washed PPS obtained from each run was dried and a sample tested for extrusion rate and cure rate according to the methods described above. The results obtained are presented in TABLE IV below.

TABLE IV

| Run No. | Molar Ratio, NaSH/NMP | | Extrusion Rate g/10 min. | Cure Rate[a] g/10 min. |
|---|---|---|---|---|
| | Dehydration | Polymerization | | |
| 13 | 0.575 | 0.35 | 52 | 14 |
| 14 | 0.57 | 0.36 | 52 | 35 |
| 15 | 0.65 | 0.35 | 41 | 20 |
| 16 | 0.65 | 0.38 | 79 | 62 |
| 17 | 0.65 | 0.40 | 78 | 46 |

[a]Cure rate is the melt flow rate measured after the polymer has been heated for 6 hours at 264° C. in an air oven.

The results in Table IV show that use of molar ratios of 0.57:1 to 0.65:1 for NaSH:NMP prior to the dehydration step were effective to produce PPS having acceptable extrusion rate and cure rate values.

That which is claimed is:

1. A process for preparing arylene sulfide polymers comprising the steps of:
   (a) admixing compounds comprising at least one sulfur source and at least one cyclic organic amide in the presence of water to form an aqueous admixture wherein the molar ratio of said sulfur source to said cyclic organic amide is above 0.55:1;
   (b) dehydrating said aqueous admixture to form a dehydrated admixture;
   (c) admixing with said dehydrated admixture at least one polymerizable halo-substituted aromatic compound selected from the group consisting of dihalo-substituted aromatic compounds and mixtures of dihalo-substituted aromatic compounds with polyhalo-substituted aromatic compounds having 3–6 halogen atoms per molecule to form a polymerization mixture;
   (d) subjecting said polymerization mixture to polymerization conditions effective to produce a mixture comprising an arylene sulfide polymer; and
   (e) recovering said arylene sulfide polymer.

2. A process according to claim 1 wherein said aqueous admixture further comprises at least one compound selected from the group consisting of alkali metal hydroxides and alkali metal carboxylates.

3. A process according to claim 1 wherein said sulfur source comprises an alkali metal sulfide.

4. A process according to claim 3 wherein said aqueous admixture further comprises at least one alkali metal carboxylate.

5. A process according to claim 4 wherein said alkali metal sulfide comprises sodium sulfide, said alkali metal carboxylate comprises sodium acetate, and said cyclic organic amide is selected from the group consisting of N,N'-ethylenedipyrrolidone, N-methyl-2-pyrrolidone, pyrrolidone, caprolactam, N-ethylcaprolactam, N-methyl-caprolactam, and mixtures thereof.

6. A process according to claim 3 wherein said halo-substituted aromatic compound comprises dihalo-substituted aromatic compounds selected from the group consisting of p-dichloro-substituted aromatic compounds and mixtures of p-dichloro-substituted aromatic commpounds with a total of 0 to about 10 mole percent of at least one of m-dichlorobenzene, o-dichlorobenzene, and alkyl-substituted p-dichlorobenzene having the formula

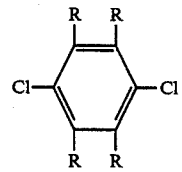

wherein R is H or an alkyl group having 1–4 carbon atoms and at least one R is not H; and wherein said cyclic organic amide is selected from the group consisting of N,N'-ethylenedipyrrolidone, N-methyl-2-pyrrolidone, pyrrolidone, caprolactam, N-ethylcaprolactam, N-methylcaprolactam, and mixtures thereof.

7. A process according to claim 5 wherein said polymerizable halo-substituted aromatic compound comprises a mixture of dihalo-substituted aromatic compounds with polyhalo-substituted aromatic compounds having 3–6 halogen atoms per molecule.

8. A process according to claim 7 wherein said dihalo-substituted aromatic compound comprises p-dichlorobenzene and said polyhalo-substituted aromatic compound comprises trichlorobenzene.

9. A process according to claim 2 wherein said sulfur source is selected from the group consisting of alkali metal bisulfides and hydrogen sulfide.

10. A process according to claim 9 wherein said cyclic organic amide is selected from the group consisting of N,N'-ethylenedipyrrolidone, N-methyl-2-pyrrolidone, pyrrolidone, caprolactam, N-ethylcaprolactam, N-methylcaprolactam, and mixtures thereof.

11. A process according to claim 10 wherein said polymerizable halo-substituted aromatic compound comprises dihalo-substituted aromatic compounds selected from the group consisting of p-dichloro-substituted aromatic compounds and mixtures of p-dichloro-substituted aromatic compounds with a total of about 0 to 10 mole percent of at least one of m- dichlorobenzene, o-dichlorobenzene, and alkyl-substituted p-dichlorobenzene having the formula

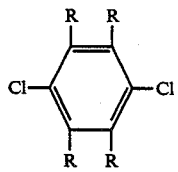

wherein R is H or an alkyl group having 1–4 carbon atoms and at least one R is not H.

12. A process according to claim 11 wherein said sulfur source comprises an alkali metal bisulfide, said cyclic organic amide comprises N-methyl-2-pyrrolidone, and said p-dichloro-substituted aromatic compound comprises p-dichlorobenzene.

13. A process according to claim 10 wherein said polymerizable halo-substituted aromatic compound comprises a mixture of dihalo-substituted aromatic compounds with polyhalo-substituted aromatic compounds having 3–6 halogen atoms per molecule.

14. A process according to claim 13 wherein said sulfur source comprises an alkali metal bisulfide, said cyclic organic amide comprises N-methyl-2-pyrrolidone, said dihalo-substituted aromatic compound comprises p-dichlorobenzene, and said polyhalo-substituted aromatic compound comprises trichlorobenzene.

15. A process according to claim 12 wherein said alkali metal bisulfide comprises sodium bisulfide.

16. A process according to claim 14 wherein said alkali metal bisulfide comprises sodium bisulfide.

17. A process for preparing arylene sulfide polymers in high yield comprising the steps of:
  (a) admixing compounds comprising at least one sulfur source and at least one cyclic organic amide in the presence of water to form an aqueous admixture wherein the molar ratio of said sulfur source to said cyclic organic amide is at least about 0.6:1 to about 1:1;
  (b) dehydrating said aqueous admixture to form a dehydrated admixture;
  (c) admixing with said dehydrated admixture at least one polymerizable halo-substituted aromatic compound selected from the group consisting of dihalo-substituted aromatic compounds and mixtures of dihalo-substituted aromatic compounds with polyhalo-substituted aromatic compounds having 3–6 halogen atoms per molecule to form a polymerization mixture;
  (d) subjecting said polymerization mixture to polymerization conditions effective to produce a mixture comprising an arylene sulfide polymer; and
  (e) recovering said arylene sulfide polymer at an increased yield compared to that obtained in a process wherein the molar ratio of said sulfur source to said cyclic organic amide in said step (a) is outside the range of at least about 0.6:1 to about 1:1.

* * * * *